US012725887B2

(12) United States Patent
Xie et al.

(10) Patent No.: US 12,725,887 B2
(45) **Date of Patent: *Sep. 1, 2026**

(54) SECONDARY BATTERY

(71) Applicant: CONTEMPORARY AMPEREX TECHNOLOGY (HONG KONG) LIMITED, Hong Kong (CN)

(72) Inventors: Mianyu Xie, Ningde (CN); Yongbin Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,283

(22) Filed: May 15, 2024

(65) Prior Publication Data

US 2024/0304957 A1 Sep. 12, 2024

Related U.S. Application Data

(63) Continuation of application No. 17/139,687, filed on Dec. 31, 2020, now Pat. No. 12,021,268, which is a (Continued)

(30) Foreign Application Priority Data

May 17, 2019 (CN) ........................ 201910413559.X

(51) Int. Cl.
*H01M 50/533* (2021.01)
*H01M 50/105* (2021.01)
*H01M 50/184* (2021.01)

(52) U.S. Cl.
CPC ....... *H01M 50/533* (2021.01); *H01M 50/105* (2021.01); *H01M 50/184* (2021.01)

(58) Field of Classification Search
CPC ............. H01M 50/178; H01M 50/184; H01M 50/533; H01M 50/105; H01M 50/119; (Continued)

(56) References Cited

U.S. PATENT DOCUMENTS

2013/0004835 A1 1/2013 Roy
2013/0065113 A1 3/2013 Oh et al.
2019/0067671 A1 2/2019 Buckholz et al.

FOREIGN PATENT DOCUMENTS

CN 1684291 A 10/2005
CN 102208594 A 10/2011
(Continued)

OTHER PUBLICATIONS

Machine translation of Japanese Patent Publication No. 2016-162744A, published Sep. 5, 2016. (Year: 2016).*
(Continued)

*Primary Examiner* — Miriam Stagg
*Assistant Examiner* — Lilia Nedialkova
(74) *Attorney, Agent, or Firm* — ANOVA LAW GROUP, PLLC

(57) ABSTRACT

A secondary battery includes an electrode assembly, a packaging bag, an electrode lead and an insulating member. The electrode assembly is housed in the packaging bag, an edge of the packaging bag has a sealing portion, and the electrode lead is connected to the electrode assembly and passes through the sealing portion; the sealing portion includes a main body region, a first step region and a first transition region, the first step region is located on two sides of the electrode lead in a thickness direction, the main body region and the first transition region are located on a same side of the first step region in a width direction, and the first transition region is connected between the first step region and the main body region; the insulating member surrounds (Continued)

an outer side of the electrode lead and isolates the sealing portion from the electrode lead.

15 Claims, 7 Drawing Sheets

Related U.S. Application Data continuation of application No. PCT/CN2020/084343, filed on Apr. 11, 2020.

(58) Field of Classification Search
CPC ... H01M 50/121; H01M 50/129; B29C 65/02; B29C 66/1122; B29C 66/322; B29C 66/433; B29C 66/71; B29C 66/72321; B29C 66/7352; B29C 66/81425; B29C 66/81431; B29C 66/83221; B29K 2023/12; B29K 2067/003; B29K 2077/00; B29K 2705/02; B29K 2705/12; B29L 2031/3468; Y02E 60/10; Y02P 70/50
See application file for complete search history.

(56) References Cited

FOREIGN PATENT DOCUMENTS

| | | | |
|---|---|---|---|
| CN | 103258980 | A | 8/2013 |
| CN | 104662697 | A | 5/2015 |
| CN | 204464336 | U | 7/2015 |
| CN | 208507818 | U | 2/2019 |
| CN | 109671983 | A | 4/2019 |
| CN | 110190206 | A | 8/2019 |
| CN | 110190316 | A | 8/2019 |
| CN | 209709099 | U | 11/2019 |
| CN | 112072013 | A | 12/2020 |
| JP | 2006310222 | A | 11/2006 |
| JP | 2012049073 | A | 3/2012 |
| JP | 2014026980 | A | 2/2014 |
| JP | 2016162744 | A | 9/2016 |
| JP | 2016225118 | A | 12/2016 |
| KR | 20080006103 | A | 1/2008 |
| KR | 20140064406 | A | 5/2014 |
| KR | 20160002176 | A | 1/2016 |
| KR | 20170004686 | A | 1/2017 |
| KR | 20170117674 | A | 10/2017 |
| WO | 2016204410 | A1 | 12/2016 |
| WO | 2018049561 | A1 | 3/2018 |

OTHER PUBLICATIONS

China National Intellectual Property Administration (CNIPA) the First Office Action for Application No. 201910413559.X Nov. 24, 2023 12 Pages (including translation).
State Intellectual Property Office of China Notice of Grant of Invention Patent Right for Application No. 202010801316.6, Oct. 27, 2023 12 pages (including translation).
China National Intellectual Property Administration (CNIPA) the First Office Action for Application No. 202010801316.6, Aug. 26, 2023 16 Pages (including translation).
United States Patent and Trademark Office (USPTO) Non-final Rejection, list of references cited, and list of references cited and considered by examiner for U.S. Appl. No. 17/139,687, filed May 25, 2023 35 Pages.
The World Intellectual Property Organization (WIPO) International Search Report and Written Opinion for PCT/CN2020/084343 Jul. 15, 2020 18 Pages (including translation).
The European Patent Office (EPO) the Extended European Search Report for U.S. Appl. No. 20/809,904.Aug. 4, 25, 2021 14 Pages.

* cited by examiner

SECONDARY BATTERY

CROSS-REFERENCE TO RELATED APPLICATIONS

This application is a continuation of application Ser. No. 17/139,687, filed on Dec. 31, 2020, which a continuation of International Application No. PCT/CN2020/084343, filed on Apr. 11, 2020, which claims priority to Chinese Patent Application No. 201910413559.X, filed on May 17, 2019. The disclosures of the aforementioned applications are hereby incorporated by reference in their entireties.

TECHNICAL FIELD

The present application relates to the field of batteries, and in particular, to a secondary battery.

BACKGROUND

With the rapid development of portable electronic devices, requirements for battery energy density are getting higher and higher. In a secondary battery, a packaging bag made of an aluminum plastic film or a steel plastic film may be used to replace a metal housing to reduce weight of the battery and increase energy density.

An electrode assembly of the secondary battery is housed in the packaging bag, and edges of the packaging bag may be connected in a sealing manner by thermal compression to form a sealing portion. Certainly, to achieve charging and discharging of the electrode assembly, the secondary battery further includes an electrode lead and an insulating member, the electrode lead is connected to the electrode assembly and extends to an outside of the packaging bag, and the insulating member surrounds an outer side of the electrode lead and isolates the electrode lead from the sealing portion. However, a region of the sealing portion close to an edge of the insulating member has a difference in height to form a step. In the thermal compression, the sealing portion wrinkles and is damaged easily at the step, which affects sealing performance of the packaging bag.

SUMMARY

In view of the problem in the background, an objective of the present application is to provide a secondary battery, which can reduce a risk of puncturing a packaging bag, improve sealing performance of the packaging bag, and improve safety performance.

To achieve the foregoing objective, the present application provides a secondary battery including an electrode assembly, a packaging bag, an electrode lead and an insulating member. The electrode assembly is housed in the packaging bag, an edge of the packaging bag has a sealing portion, and the electrode lead is connected to the electrode assembly and passes through the sealing portion. The sealing portion includes a main body region, a first step region and a first transition region, the first step region is located on two sides of the electrode lead in a thickness direction, the main body region and the first transition region are located on a same side of the first step region in a width direction, and the first transition region is connected between the first step region and the main body region. The insulating member surrounds an outer side of the electrode lead and isolates the sealing portion from the electrode lead; the insulating member includes a first part, and in the thickness direction, the first part is located between the electrode lead and the first step region and covers the electrode lead from two sides. A sum of thicknesses of the first step region, the first part and the electrode lead is $H_1$, a thickness of the main body region is $H_2$, and $H_1>H_2$. A minimum distance between the electrode lead and an outer surface of the first transition region is $D_1$, a minimum distance between the electrode lead and an outer surface of the first step region is $D_2$, and $D_1 \geq D_2$.

As an improvement of the secondary battery of the present application, the first transition region connects the main body region and the first step region, the first transition region has two outer surfaces disposed oppositely in the thickness direction, and the two outer surfaces are inclined toward a direction close to the first step region relative to the main body region.

As an improvement of the secondary battery of the present application, an included angle between an outer surface of the first transition region and the outer surface of the first step region is 100° ~170°.

As an improvement of the secondary battery of the present application, the electrode lead includes a base portion and an edge portion, the edge portion is connected to the base portion and located on one side of the base portion close to the first transition region in the width direction. In a direction away from the base portion, a thickness of the edge portion gradually reduces.

As an improvement of the secondary battery of the present application, the edge portion has a first surface facing the first step region, and the base portion has a second surface facing the first step region. The first surface is connected to the second surface, and an included angle between the two is greater than or equal to 120°.

As an improvement of the secondary battery of the present application, a minimum thickness of the edge portion is greater than 100 μm.

As an improvement of the secondary battery of the present application, in the width direction, a ratio of a size of the edge portion to a size of the base portion is 0.1-0.4.

As an improvement of the secondary battery of the present application, in the width direction, the first step region is beyond the electrode lead. The insulating member further includes a second part, the second part is connected to the first part, and a part of the first step region beyond the electrode lead covers the second part from two sides.

As an improvement of the secondary battery of the present application, the sealing portion includes a second step region, and the second step region connects the main body region and the first transition region. The insulating member further includes a third part and a fourth part, the third part extends from an end of the second part away from the electrode lead, and the fourth part extends from an end of the third part away from the second part. In the thickness direction, the first transition region covers the third part from two sides, and the second step region covers the fourth part from two sides. A sum of thicknesses of the second step region and the fourth part is $H_4$, and $H_2<H_4<H_1$.

As an improvement of the secondary battery of the present application, a minimum thickness of the edge portion is $H_5$, and $H_5<H_4$.

As an improvement of the secondary battery of the present application, in a direction in which the second part points to the fourth part, a thickness of the third part gradually reduces.

As an improvement of the secondary battery of the present application, a value of $D_2$ is greater than 150 μm.

As an improvement of the secondary battery of the present application, the packaging bag includes two packaging films, the electrode assembly is located between the two packaging films, and the two packaging films are connected at edges to form the sealing portion. Each packaging film includes a protective layer, a metal layer and a connecting layer, the connecting layer is disposed on a surface of the metal layer facing the electrode assembly, and the protective layer is disposed on a surface of the metal layer away from the electrode assembly. In the main body region, connecting layers of the two packaging films are fused into one body; and in the first step region, the connecting layer of each packaging film is fused to the first part.

The beneficial effects of the present application are as follows: since there is a difference in height between a main body region and a first step region, in a process of thermal compression, a first transition region is stretched, which results in that its strength becomes smaller. Therefore, in the present application, preferably, $D_1 \geq D_2$, thereby reducing a risk of puncturing the first transition region by an end part of an electrode lead, improving sealing performance of a packaging bag, and improving safety performance.

REFERENCE SIGNS ARE EXPLAINED AS FOLLOWS

- 1 electrode assembly
- 2 packaging bag
  - 21 sealing portion
    - 211 main body region
    - 212 first step region
    - 213 second step region
    - 214 first transition region
    - 215 second transition region
  - 22 packaging film
    - 221 protective layer
    - 222 metal layer
    - 223 connecting layer
- 3 electrode lead
  - 31 base portion
  - 32 edge portion
- 4 insulating member
  - 41 first part
  - 42 second part
  - 43 third part
  - 44 fourth part
- 5 encapsulating device
  - 51 first encapsulating surface
  - 52 second encapsulating surface
  - 53 third encapsulating surface
- 6 colloid
- X length direction
- Y width direction
- Z thickness direction

DESCRIPTION OF EMBODIMENTS

To make the objectives, technical solutions, and advantages of the present application clearer and more comprehensible, the present application will be further described below in detail with reference to the accompanying drawings and embodiments. It should be understood that the specific embodiments described herein are merely used to explain the present application, but are not intended to limit the present application.

In the description of the present application, unless otherwise specified and limited explicitly, the terms "first", "second", "third" and "fourth" are merely intended for a purpose of description, and shall not be understood as an indication or implication of relative importance. The term "a plurality of" refers to more than two (including two). Unless otherwise specified or illustrated, the term "connection" should be understood broadly, for example, the "connection" may either be a fixed connection, or a detachable connection, or an integrated connection, or an electrical connection, or a signal connection; and the "connection" may either be a direct connection, or an indirect connection through an intermediary. Those of ordinary skill in the art may appreciate the specific meanings of the foregoing terms in the present application according to specific conditions.

In the description of the specification, it should be understood that the terms representing directions such as "up" and "down" described in the embodiments of the present application are described from the angles shown in the accompanying drawings, and should not be understood as limitation on the embodiments of the present application. The present application will be further described below in detail through the specific embodiments with reference to the accompanying drawings.

Figure 1:
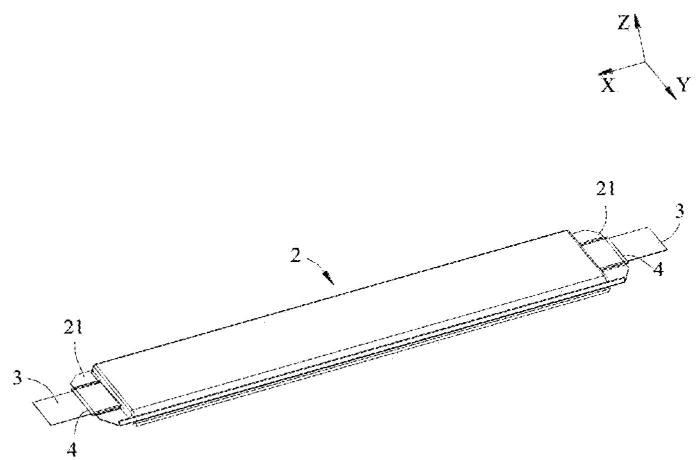
FIG. 1 is a schematic diagram of a secondary battery provided in a first embodiment of the present application.
Figure 2:
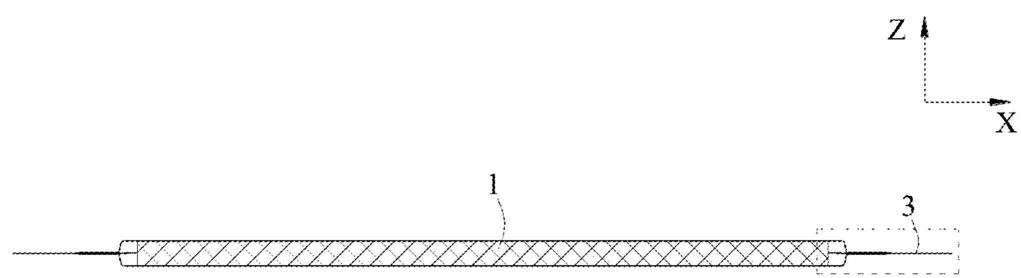
FIG. 2 is a sectional view of a secondary battery provided in a first embodiment of the present application.
Figure 3:
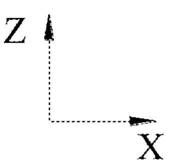
FIG. 3 is an enlarged view of a block part of FIG. 2.
Figure 3:
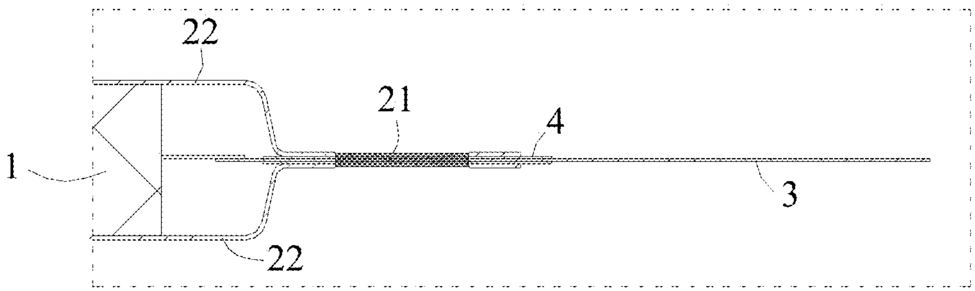

With reference to FIG. 1 and FIG. 2, in a first embodiment, a secondary battery provided in the present application includes an electrode assembly 1, a packaging bag 2, an electrode lead 3 and an insulating member 4.

The electrode assembly 1 is a core member of the secondary battery for achieving charging and discharging functions. The electrode assembly 1 includes a positive electrode sheet, a negative electrode sheet and a diaphragm, and the diaphragm isolates the positive electrode sheet from the negative electrode sheet. The positive electrode sheet includes a positive electrode current collector and a positive active material layer coated on a surface of the positive electrode current collector, the positive electrode current collector may be aluminum foil, and the positive active material layer includes a ternary material, lithium manganate or lithium iron phosphate. The negative electrode sheet includes a negative electrode current collector and a negative active material layer coated on a surface of the negative electrode current collector, the negative electrode current collector may be copper foil, and the negative active material layer includes graphite or silicon.

The electrode assembly 1 may be in a winding structure. Specifically, there is one positive electrode sheet and one negative electrode sheet, and the positive electrode sheet and the negative electrode sheet are in banded structures. The positive electrode sheet, the diaphragm and the negative electrode sheet are stacked in sequence and wound more than two turns to form the electrode assembly 1. When the electrode assembly 1 is produced, the electrode assembly 1 may be wound into a hollow cylindrical structure first, and then flattened into a flat shape after the winding.

Alternatively, the electrode assembly 1 may also be in a laminated structure. Specifically, the positive electrode sheet is set in plurality, the negative electrode sheet is set in plurality, the plurality of positive electrode sheets and the plurality of negative electrode sheets are stacked alternately in a thickness direction Z, and the diaphragm isolates the positive electrode sheet from the negative electrode sheet.

Figure 6:
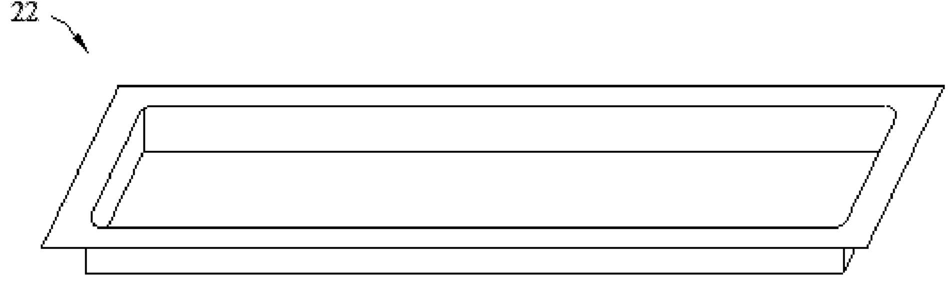
FIG. 6 is a schematic diagram of a packaging film of a packaging bag of a secondary battery provided in a first embodiment of the present application.

The packaging bag 2 includes two packaging films 22, and the two packaging films 22 are arranged up and down in the thickness direction Z. With reference to FIG. 6, at least one packaging film 22 is stamped to form a concave chamber, and the electrode assembly 1 is located between the two packaging films 22 and housed in the concave chamber.

Figure 7:
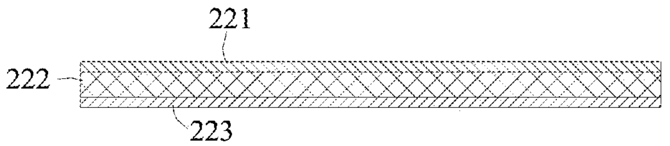
FIG. 7 is a sectional view of the packaging film of FIG. 6.

With reference to FIG. 7, each packaging film 22 includes a protective layer 221, a metal layer 222 and a connecting layer 223, and the protective layer 221 and the connecting layer 223 are respectively disposed on two sides of the metal layer 222. Specifically, the protective layer 221 may be fixed to a surface of the metal layer 222 away from the electrode assembly 1 through a binder, and the connecting layer 223 may be fixed to a surface of the metal layer 222 close to the electrode assembly 1 through the binder. A thickness of the packaging film 22 may be 0.1 μmm-0.3 mm.

A material of the protective layer 221 may be nylon or polyethylene glycol terephthalate, a material of the metal layer 222 may be aluminum foil or steel foil, and a material of the connecting layer 223 may be polypropylene.

The two packaging films 22 are connected at edges to form a sealing portion 21. Specifically, by thermal compression, connecting layers 223 of the two packaging films 22 are directly or indirectly connected together, thereby forming a sealed packaging bag 2.

The electrode lead 3 is connected to the electrode assembly 1, passes through the sealing portion 21 and extends to an outside of the packaging bag 2. Specifically, there may be two electrode leads 3, one electrode lead 3 is connected to the positive electrode current collector of the positive electrode sheet, and the other electrode lead 3 is connected to the negative electrode current collector of the negative electrode sheet. The two electrode leads 3 connect the electrode assembly 1 and other members outside the packaging bag 2, and then charging and discharging of the electrode assembly 1 are achieved. A material of the electrode lead 3 may be aluminum, nickel or copper plated with nickel.

The two electrode leads 3 may respectively extend from two ends of the packaging bag 2 in a length direction X, or extend from the same end of the packaging bag 2 in the length direction X.

There may be two insulating members 4. The two insulating members 4 respectively isolate the two electrode leads 3 from the sealing portion 21. Each insulating member 4 surrounds an outer side of a corresponding electrode lead 3. A part of the insulating member 4 is clamped between the two packaging films 22, thereby isolating the electrode lead 3 from the packaging films 22 and reducing a risk of contact of the electrode lead 3 with the metal layer 222. A material of the insulating member 4 may be polypropylene.

Since a part of the insulating member 4 is clamped between the two packaging films 22, when thermal compression is performed on the two packaging films 22, the connecting layers 223 of the two packaging films 22 are fused to the insulating member 4.

Figure 4:
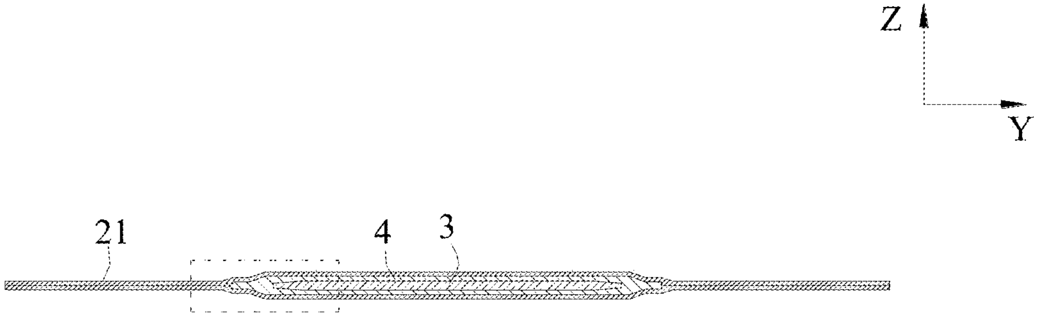
FIG. 4 is another sectional view of the secondary battery of FIG. 1.
Figure 5:
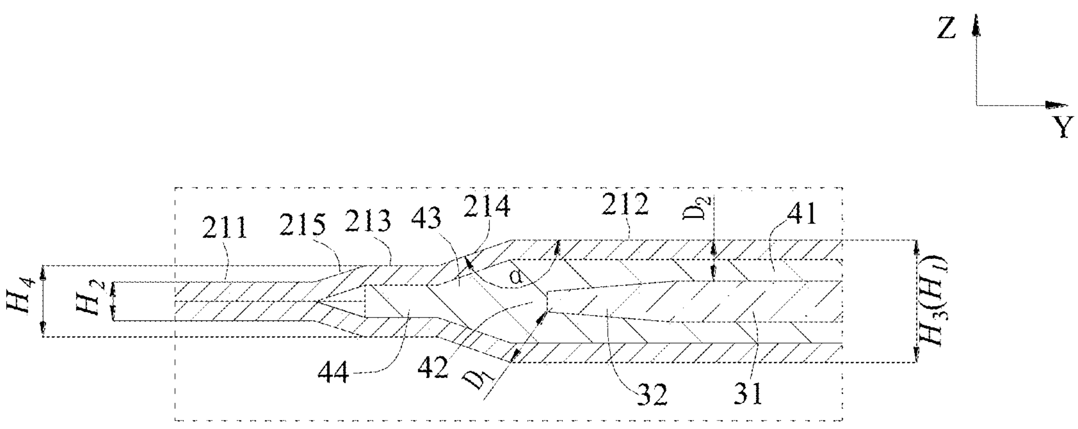
FIG. 5 is an enlarged view of a block part of FIG. 4.

Specifically, with reference to FIG. 4 and FIG. 5, the sealing portion 21 includes a main body region 211, s first step region 212 and a first transition region 214. The first step region 212 is located on two sides of the electrode lead 3 in the thickness direction Z, the main body region 211 and the first transition region 214 are located on a same side of the first step region 212 in a width direction Y, and the first transition region 214 is connected between the first step region 212 and the main body region 211.

The insulating member 4 includes a first part 41, and in the thickness direction Z, the first part 41 is located between the electrode lead 3 and the first step region 212 and covers the electrode lead 3 from two sides. The first step region 212 is divided into upper and lower layers, and the first part 41 is located between the two layers of the first step region 212.

In the first step region 212, the connecting layer 223 of each packaging film 222 is fused to the first part 41. In the thickness direction Z, a sum of thicknesses of the first step region 212, the first part 41 and the electrode lead 3 is $H_1$. $H_1$ is generally a constant value. Certainly, due to a thermal compression process, $H_1$ may fluctuate within a certain range, for example, by plus or minus 0.01 μmm.

In the main body region 211, the connecting layers 223 of the two packaging films 22 are directly fused into one body. In the thickness direction Z, a thickness of the main body region 211 is $H_2$. $H_2$ is generally a constant value. Certainly, due to the thermal compression process, the thickness $H_2$ of the main body region 211 may fluctuate within a certain range, for example, by plus or minus 0.01 μmm. A value of $H_2$ may be 0.2 μmm-0.4 μmm.

In the main body region 211, the two packaging films 22 are directly fused together; and in the first step region 212, the two packaging films 22 and the first part of the insulating member 4 are fused together. Therefore, the value of $H_2$ is less than a value of $H_1$, and there is a difference in height between the main body region 211 and the first step region 212. The first transition region 214 connected between the main body region 211 and the first step region 212 may play a role of transition.

Figure 8:
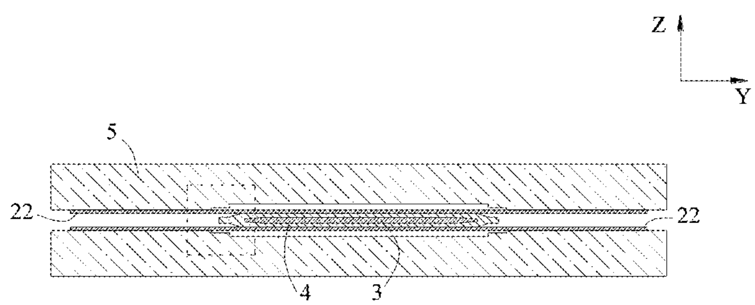
FIG. 8 is a schematic diagram of a secondary battery provided in a first embodiment of the present application before molding.
Figure 9:
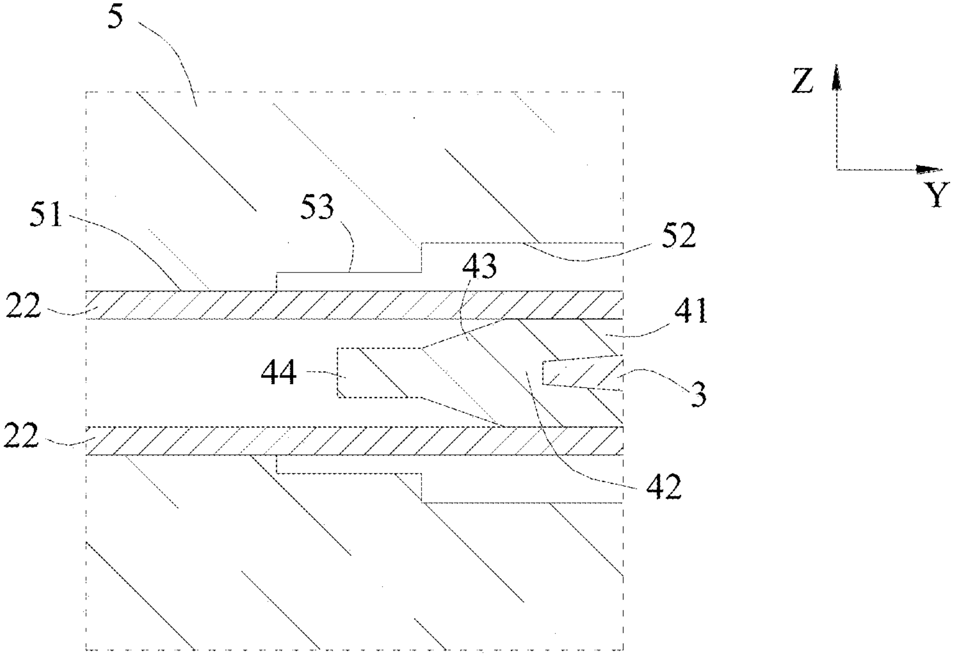
FIG. 9 is an enlarged view of a block part of FIG. 8.

To achieve fusion of the main body region 211 and fusion of the first step region 212, an encapsulating device 5 having stepped encapsulating surfaces is usually used. Specifically, with reference to FIG. 8 and FIG. 9, the encapsulating device 5 includes a first encapsulating surface 51 and a second encapsulating surface 52, and the second encapsulating surface 52 is recessed relative to the first encapsulating surface 51. In the thermal compression, the first encapsulating surface 51 acts on the main body region 211, and the second encapsulating surface 52 acts on the first step region 212.

Figure 10:
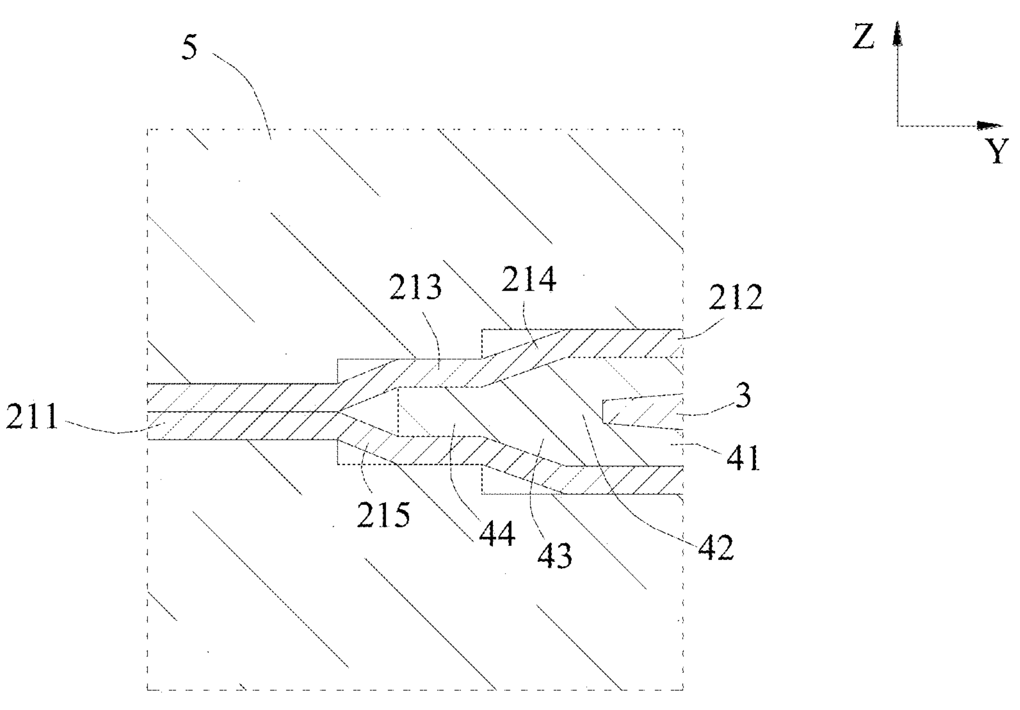
FIG. 10 is a schematic diagram of a secondary battery provided in a first embodiment of the present application in a molding process.
Figure 11:
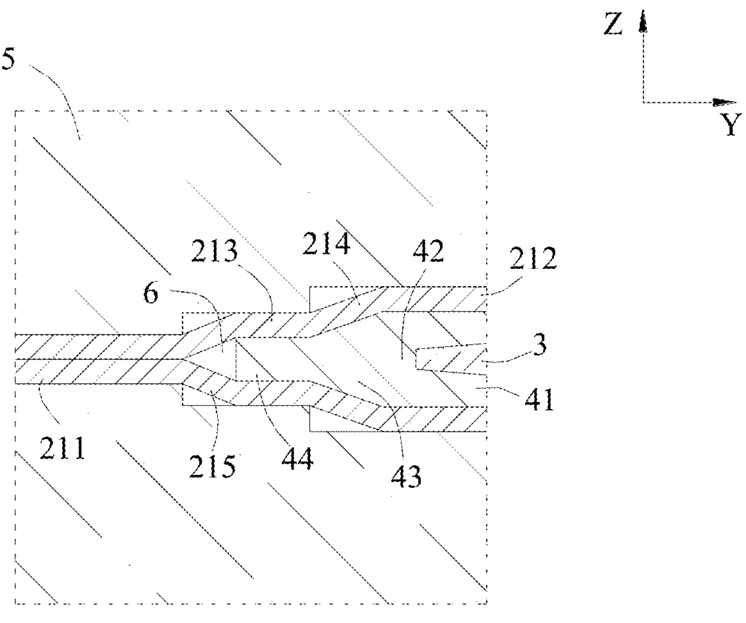
FIG. 11 is another schematic diagram of a secondary battery provided in a first embodiment of the present application in a molding process.

With reference to FIG. 10 and FIG. 11, in the process of thermal compression, the first part 41 and the connecting layer 223 located in the first step region 212 are heated to melt and generate an adhesive colloid 6, part of the colloid 6 flows to a gap of the first transition region 214 under the action of pressure, and the colloid 6 fills the gap and bonds the connecting layer 223 located in the first transition region 214 together, thereby achieving sealing.

However, in the process of thermal compression, stress concentration occurs easily at an end part of the electrode lead 3, and at the same time, the first part 41 is compressed thinly. If the first part 41 is too thin, stress at the end part of the electrode lead 3 easily punctures the first part 41, even the sealing portion 21, which results in that an electrolyte corrodes the metal layer 222 in the sealing portion 21, thereby reducing sealing performance of the packaging bag 2. In addition, when the electrode lead 3 is in contact with the metal layer 222 of the sealing portion 21, a risk of a short circuit is easily caused.

With reference to FIG. 5, a minimum distance between the electrode lead 3 and an outer surface of the first step region 212 is $D_2$. The electrode lead 3 is generally a thin sheet parallel to the length direction X, and thus in a plane perpendicular to the length direction X, a distance between the electrode lead 3 and the outer surface of the first step region 212 is minimum. Since the first step region 212 is generally a thin sheet perpendicular to the thickness direction Z, $D_2$ is generally the minimum distance between the electrode lead 3 and the outer surface of the first step region 212 in the thickness direction Z. The smaller a value of $D_2$ is, and the easier the first step region 212 is to be punctured by the electrode lead 3. The value of $D_2$ may be changed by controlling a compression rate of the first part 41 in the thermal compression. Therefore, according to the embodiment of the present application, the value of $D_2$ can satisfy a certain range according to needs, for example, be greater than 150 μm, to avoid puncturing the first step region 212 by the electrode lead 3.

A minimum distance between the electrode lead 3 and an outer surface of the first transition region 214 is $D_1$. Similarly, the electrode lead 3 is generally a thin sheet parallel to the length direction X, and thus in the plane perpendicular to the length direction X, a distance between the electrode lead 3 and the outer surface of the first transition region 214 is minimum. Since the first transition region 214 is located on one side of the first step region 212 in the width direction Y, a distance between an end port of the electrode lead 3 in the width direction Y and the outer surface of the first transition region 214 is minimum. Similarly, the smaller a value of $D_1$ is, and the easier the first transition region is to be punctured by the electrode lead 3.

However, since there is the difference in height between the main body region 211 and the first step region 212, in the process of thermal compression, the first transition region 214 is inclined toward a direction close to the main body region 211 and the electrode leads 3; and at the same time, the first transition region 214 is stretched. After the first transition region 214 is stretched, its thickness and strength both become smaller. If the value of $D_1$ is smaller than the value of $D_2$, the first transition region 214 is easily punctured by the end part of the electrode lead 3, thereby reducing the sealing performance of the packaging bag 2 and causing a risk of a short circuit. Therefore, according to the embodiment of the present application, preferably, $D_1 \geq D_2$, to reduce a risk of puncturing the packaging bag 2 and improve safety performance.

The first transition region 214 connects the main body region 211 and the first step region 212, the first transition region 214 has two outer surfaces disposed oppositely in the thickness direction Z, and the two outer surfaces are inclined toward a direction close to the first step region 212 relative to the main body region 211. The outer surface of the first transition region 214 connects an outer surface of the main body region 211 and the outer surface of the first step region 212. The outer surface of the first transition region 214 may extend from an end part of the outer surface of the first step region 212, and is inclined toward a direction close to the outer surface of the main body region 211 relative to the outer surface of the first step region 212. In the thickness direction Z, spacing between the two outer surfaces of the first transition region 214 is L. In a direction in which the main body region 211 points to the electrode lead 3, a value of L gradually increases.

With reference to FIG. 5, an included angle $\alpha$ between an outer surface of the first transition region 214 and the outer surface of the first step region 212 is 100° ~170°. The smaller a value of $\alpha$ is, and the closer a distance between the first transition region 214 and the end part of the electrode lead 3 is. That is, the less the value of $D_1$ may be, and the higher a risk of puncturing the first transition region 214 by the electrode lead 3 is. Therefore, preferably, the value of $\alpha$ is not less than 100°. When the values of $H_1$ and $H_2$ are constant, the greater the value of $\alpha$ is, the more gentle the outer surface of the first transition region 214 is, and correspondingly, the larger a size of the first transition region 214 in the width direction Y is. Since a size of the secondary battery in the width direction Y is limited, the larger space occupied by the first transition region 214 in the width direction Y is, and the smaller space that other members (such as the electrode lead 3) can use is. Therefore, to avoid occupying too much space by the first transition region 214, the value of $\alpha$ is not greater than 170°.

Figure 12:
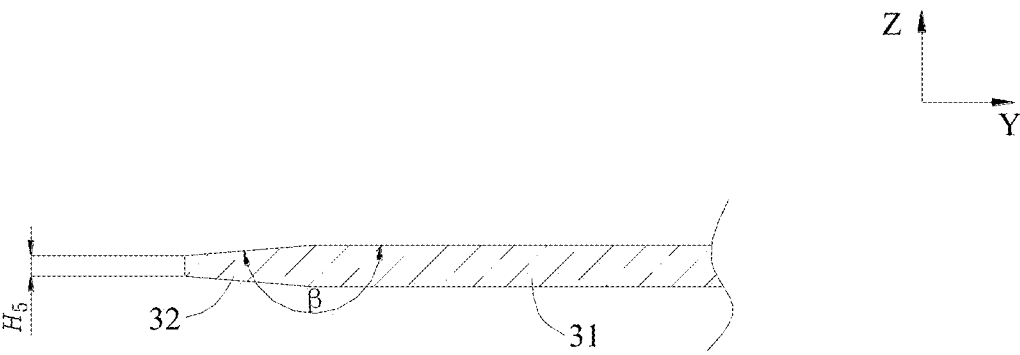
FIG. 12 is a schematic diagram of an electrode lead of a secondary battery provided in a first embodiment of the present application.
Figure 13:
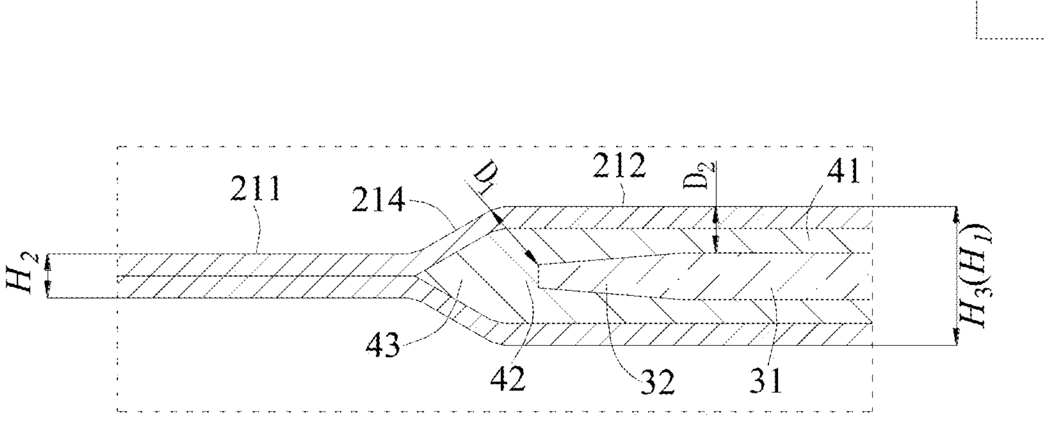
FIG. 13 is a schematic diagram of a secondary battery provided in a second embodiment of the present application.

With reference to FIG. 5 and FIG. 12, the electrode lead 3 includes a base portion 31 and an edge portion 32, the edge portion 32 is connected to the base portion 31 and located on one side of the base portion 31 close to the first transition region 214 in the width direction Y, Compared with the base portion 31, the edge portion 32 is closer to the first transition region 214. Further, a distance between one end of the edge portion 32 away from the base portion 31 and the first transition region 214 is minimum.

The value of $D_1$ is determined by spacing between the edge portion 32 and the first transition region 214 in the width direction Y and spacing between the edge portion 32 and the first transition region 214 in the thickness direction Z. To increase the value of $D_1$, according to the embodiment of the present application, a thickness of the edge portion 32 is reduced. In addition, to reduce stress at a connection of the edge portion 32 and the base portion 32 and achieve smooth transition, preferably, in a direction away from the base portion 31, the thickness of the edge portion 32 gradually reduces.

The edge portion 32 has a first surface facing the first step region 212, and the first surface is connected to the first part 41. Since the thickness of the edge portion 32 gradually reduces, the first surface is inclined relative to a reference plane perpendicular to the thickness direction Z. There are two first surfaces, and the two first surfaces face each other in the thickness direction Z.

The base portion 31 has a second surface facing the first step region 212, and the second surface is connected to the first part 41. The second surface is a plane generally perpendicular to the thickness direction Z. There are two second surfaces, and the two second surfaces face each other in the thickness direction Z.

Preferably, with reference to FIG. 12, the first surface is connected to the second surface, and an included angle $\beta$ between the two is greater than or equal to 120°. An edge is formed at a connection of the first surface and the second surface, and stress concentration occurs easily at the edge. If a value of β is too small, the edge is shaper, and a risk of puncturing the first part 41 and the first step region 212 in the thermal compression is higher. Therefore, to reduce the risk of puncturing the first part 41 and the first step region 212, β is preferably greater than 120°.

With reference to FIG. 12, an area of a section of the electrode lead 3 perpendicular to the length direction X determines a current flow capacity of the electrode lead 3. If the thickness of the edge portion 32 is too small, it will result in an insufficient current flow capacity of the electrode lead 3. Meanwhile, when the thickness of the edge portion 32 is too small, strength of the electrode lead 3 will be relatively small, and the electrode lead 3 easily deforms. Therefore, to ensure a current flow area and the strength of the electrode lead 3, a minimum thickness $H_5$ of the edge portion 32 is greater than 100 μm.

In the width direction Y, a ratio of a size of the edge portion 32 to a size of the base portion 31 is 0.1-0.4. The thickness of the edge portion 32 is small, and a current flow capacity and strength of the edge portion 32 are both smaller than that of the base portion 31. If the ratio is greater than 0.4, the size of the edge portion 32 is larger, which will results in an insufficient overall current flow area and weak strength of the electrode lead 3. When the thickness of the base portion 31 and the minimum thickness of the edge portion 32 are constant, the smaller the size of the edge portion 32 in the width direction Y is, and the greater the value of β is. Therefore, if the ratio is less than 0.1, it will result in a too great value of β, and the risk of puncturing the first part 41 and the first step region 212 is higher. Therefore, preferably, in the width direction Y, the ratio of the size of the edge portion 32 to the size of the base portion 31 is 0.1-0.4.

In the width direction Y, a size of the first step region 212 is greater than a size of the electrode lead 3. Preferably, the first step region 212 is beyond the electrode lead 3 in the width direction Y In other words, one end of the first step region 212 close to the main body region 211 in the width direction Y is beyond the electrode lead 3, and one end of the first step region 212 away from the main body region 211 in the width direction Y is also beyond the electrode lead 3.

In the embodiment of the present application, by increasing the size of the first step region 212 in the width direction Y, a distance between the first transition region 214 and the edge portion 32 in the width direction Y can be increased, thereby increasing the value of $D_1$ and reducing a safety risk.

The insulating member 4 further includes a second part 42, the second part 42 is connected to the first part 41, and a part of the first step region 212 beyond the electrode lead 3 covers the second part 42 from two sides. The first part 41 is divided into upper and lower layers by the electrode lead 3, and the second part 42 connects the two layers of the first part 41 together. A sum of thicknesses of the second part 42 and the first step region 212 is $H_3$. Before the thermal compression, values of $H_3$ and $H_1$ are generally the same, but the electrode lead 3 is made of metal and is not easily compressed, and thus the value of $H_3$ may be slightly less than the value of $H_1$ after the thermal compression.

The sealing portion 21 includes a second step region 213, and the second step region 213 connects the main body region 211 and the first transition region 214. In the width direction Y, the second step region 213 is located between the main body region 211 and the first transition region 214. The insulating member 4 further includes a third part 43 and a fourth part 44, the third part 43 extends from an end of the second part 42 away from the electrode lead 3, and the fourth part 44 extends from an end of the third part 43 away from the second part 42. in the thickness direction Z, the first transition region 214 covers the third part 43 from two sides, and the second step region 213 covers the fourth part 44 from two sides.

In the first transition region 214, the connecting layers 223 of the two packaging films 22 are fused to the third part 43; and in the second step region 213, the connecting layers 223 of the two packaging films 22 are fused to the fourth part 44.

A sum of thicknesses of the second step region 213 and the fourth part 44 is $H_4$, and $H_2<H_4<H_1$. $H_4$ is generally a constant value. Certainly, due to the thermal compression process, $H_1$ may fluctuate within a certain range, for example, by plus or minus 0.01 μmm. A value of $H_4$ may be 0.3 μmm-0.9 μmm.

In the first step region 212, the first part 41 and the electrode lead 3 are disposed between the two packaging films 22, and thus $H_2$ and $H_1$ have a greater difference value. In the thermal compression, a degree of stretching the first transition region 214 is great, which results in damage to the metal layer 222 located in the first transition region 214 and affects sealing performance. To reduce the degree of stretching the first transition region 214, according to the embodiment of the present application, the second step region 213 is preferably provided. The second step region 213 can play a role of transition, and a difference in height between the second step region 213 and the main body area 211 and a difference in height between the second step region 213 and the first step region 212 are reduced, thereby reducing the degree of stretching the first transition region 214, reducing stress concentration, and improving the sealing performance.

When the value of $H_1$ is constant, the value of α can be increased by increasing the value of $H_4$, thereby increasing the value of $D_1$. Similarly, the value of $D_1$ can also be increased by reducing the value of $H_5$. That is, both the value of $H_4$ and the value of $H_5$ have a direct influence on the value of $D_1$. The applicant comprehensively considers $H_4$ and $H_5$, and preferably, $H_5<H_4$. In this case, it can be ensured that the edge portion 32 and the first transition region 214 are spaced by a sufficient distance in the vertical direction Z, and the value of $D_1$ is increased, thereby improving the sealing performance.

Since the first transition region 214 is disposed obliquely, to ensure that the third part 43 can be attached to the first transition region 214 and avoid that the third part 43 blocks deformation of the first transition region 214 in the thermal compression process, the third part 43 needs to have an inclined surface. In other words, in a direction in which the second part 42 points to the fourth part 44, a thickness of the third part 43 gradually reduces. A minimum thickness of the third part 43 is equal to a thickness of the fourth part 44, and a maximum thickness of the third part 43 is equal to a thickness of the second part 42.

To thermally compress the second step region 213, the encapsulating device 5 further includes a third encapsulating surface 53. The third encapsulating surface 53 is located between the first encapsulating surface 51 and the second encapsulating surface 52; and relative to the first encapsulating surface 51, a degree of recessing of the third encapsulating surface 53 is smaller than a degree of recessing of the second encapsulating surface 52.

Preferably, the sealing portion 21 further includes a second transition region 215, and the second transition region 215 is connected between the main body region 211 and the second step region 213. With reference to FIG. 10, due to process errors, in the thermal compression, there may be a certain distance between the main body region 211 and the fourth part 44, which results in that the second transition region 215 is unable to be attached to the fourth part 44. In this case, in the second transition region 215, a gap is left between the two packaging films 22. In addition, in the thermal compression, the second transition region 215 is in an inclined state and is not subject to the pressure of the third encapsulating surface 53. Therefore, in the second transition region 215, the connecting layers 223 of the two packaging films 22 are unable to be directly fused together.

With reference to FIG. 11, in the process of thermal compression, the fourth part 44 and the connecting layer 223 located in the second step region 213 are heated to melt and generate an adhesive colloid 6, part of the colloid 6 flows to a gap of the second transition region 215 under the action of pressure, and the colloid 6 fills the gap and bonds the connecting layer 223 located in the second transition region 215 together, thereby achieving sealing.

Other embodiments of the secondary battery provided in the embodiment of the present application will be described below. To simplify the description, only differences between the other embodiments and the first embodiment will be mainly introduced below, and the parts not described can be understood with reference to the first embodiment.

With reference to 13, in a second embodiment, the second step region 213 may be omitted. According to the embodiment of the present application, the value of $D_1$ can be increased by increasing the size of the first step region 212 in the width direction Y and providing the second part 42. The increase of the value of $D_1$ can reduce the risk of puncturing the packaging bag 2 and improve safety performance.

Figure 14:
FIG. 14 is a schematic diagram of a secondary battery provided in a third embodiment of the present application.
Figure 14:
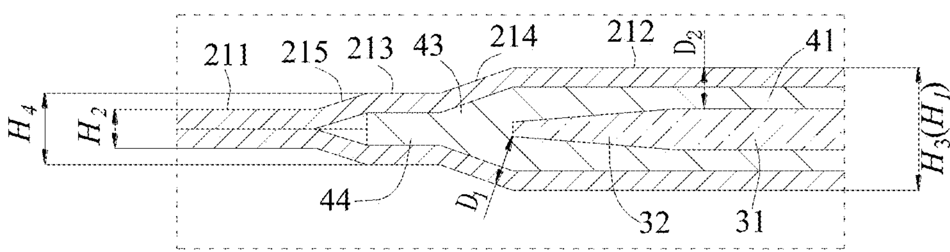

With reference to FIG. 14, in a third embodiment, the size of the electrode lead 3 in the width direction Y may be equal to or greater than the size of the first step region 212. In this case, the second part 42 is omitted. According to the embodiment of the present application, the value of $D_1$ is increased by reducing the thickness of the edge portion 32, thereby reducing the risk of puncturing the packaging bag 2 and improving safety performance. Certainly, compared with embodiment one, to make the value of $D_1$ meet requirements, the edge portion 32 in the third embodiment needs to have a smaller thickness.

What is claimed is:

1. A secondary battery, comprising an electrode assembly, a packaging bag, an electrode lead and an insulating member, wherein:

the electrode assembly is housed in the packaging bag, an edge of the packaging bag has a sealing portion, and the electrode lead is connected to the electrode assembly and passes through the sealing portion; and the insulating member surrounds an outer side of the electrode lead and isolates the sealing portion from the electrode lead, the insulating member comprising:

a first part covering the electrode lead from two sides in a thickness direction;

a second part connected to the first part in a width direction and having a uniform thickness;

a third part extending from an end of the second part away from the electrode lead; and a fourth part extending from an end of the third part away from the second part;

wherein:

the second part, the third part, and the fourth part do not cover any portion of the electrode lead in the thickness direction;

in a direction in which the second part points to the fourth part, a thickness of the third part gradually and continuously reduces all the way from a first end of the third part connected to the second part to a second end of the third part connected to the fourth part;

the sealing portion comprises a main body region, a first step region, and a first transition region, the first step region is located on two sides of the electrode lead in the thickness direction, the first transition region connects the main body region and the first step region;

the first transition region has two outer surfaces disposed oppositely in the thickness direction, the two outer surfaces are inclined toward a direction close to the first step region relative to the main body region;

in the thickness direction, the first transition region covers the third part from two sides;

the electrode lead comprises a base portion and an edge portion, the edge portion is connected to the base portion and located on one side of the base portion close to the first transition region in the width direction; and in a direction away from the base portion, a thickness of the edge portion gradually reduces.

2. The secondary battery according to claim 1, wherein the main body region and the first transition region are located on a same side of the first step region in a width direction.

3. The secondary battery according to claim 2, wherein an included angle between an outer surface of the first transition region and the outer surface of the first step region is 100°~170°.

4. The secondary battery according to claim 2, wherein:

a minimum distance between the electrode lead and an outer surface of the first transition region is $D_1$, a minimum distance between the electrode lead and an outer surface of the first step region is $D_2$, and $D_1 \geq D_2$; and a value of $D_2$ is greater than 150 μm.

5. The secondary battery according to claim 2, wherein:

the packaging bag comprises two packaging films, the electrode assembly is located between the two packaging films, and the two packaging films are connected at edges to form the sealing portion;

each packaging film comprises a protective layer, a metal layer, and a connecting layer, the connecting layer is disposed on a surface of the metal layer facing the electrode assembly, and the protective layer is disposed on a surface of the metal layer away from the electrode assembly; and in the main body region, connecting layers of the two packaging films are welded into one body, and in the first step region, the connecting layer of each packaging film is welded to the first part.

6. The secondary battery according to claim 1, wherein a minimum thickness of the edge portion is greater than 100 μm.

7. The secondary battery according to claim 1, wherein in the width direction, a ratio of a size of the edge portion to a size of the base portion is 0.1-0.4.

8. The secondary battery according to claim 1, wherein the edge portion has a first surface facing the first step region, the base portion has a second surface facing the first step region, the first surface is connected to the second surface, and an included angle between the two is greater than or equal to 120°.

9. The secondary battery according to claim 8, wherein a minimum thickness of the edge portion is greater than 100 μm.

10. The secondary battery according to claim 8, wherein in the width direction, a ratio of a size of the edge portion to a size of the base portion is 0.1-0.4.

11. The secondary battery according to claim 1, wherein:
- in the width direction, the first step region is beyond the electrode lead; and
- a part of the first step region beyond the electrode lead covers the second part from two sides.

12. The secondary battery according to claim 11, wherein:
- the sealing portion comprises a second step region, and the second step region connects the main body region and the first transition region; and
- in the thickness direction, the first transition region covers the third part from two sides, and the second step region covers the fourth part from two sides.

13. The secondary battery according to claim 12, wherein a sum of thicknesses of the first step region, the first part, and the electrode lead is $H_1$, a thickness of the main body region is $H_2$, a sum of thicknesses of the second step region and the fourth part is $H_4$, and $H_2<H_4<H_1$.

14. The secondary battery according to claim 13, wherein a minimum thickness of the edge portion is $H_5$, and $H_5<H_4$.

15. The secondary battery according to claim 1, wherein the electrode assembly is in a winding structure or in a laminated structure.

* * * * *